United States Patent
Severwright

[19]

[11] Patent Number: 6,055,634
[45] Date of Patent: *Apr. 25, 2000

[54] SECURE INTERNAL COMMUNICATION SYSTEM

[75] Inventor: Robert Anthony Severwright, Hockley, United Kingdom

[73] Assignee: GEC-Marconi Limited, Middlesex, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/607,606

[22] Filed: Feb. 27, 1996

[30] Foreign Application Priority Data

Mar. 14, 1995 [GB] United Kingdom ................... 9505095

[51] Int. Cl.[7] ....................................................... H04L 9/00
[52] U.S. Cl. ......................... 713/164; 713/166; 713/154; 713/153
[58] Field of Search .............................. 395/186, 187.01, 395/188.01; 370/458, 523, 522, 242, 243; 379/95; 380/20, 49, 240, 241, 242; 713/154, 153, 164, 166

[56] References Cited

U.S. PATENT DOCUMENTS

| | | |
|---|---|---|
| 4,797,918 | 1/1989 | Lee et al. ................................... 380/20 |
| 4,903,298 | 2/1990 | Cline ............................................ 380/9 |
| 4,926,476 | 5/1990 | Covey et al. ............................. 713/164 |
| 4,984,272 | 1/1991 | McIlroy et al. .......................... 713/166 |
| 5,029,206 | 7/1991 | Marino, Jr. et al. ..................... 713/164 |
| 5,283,828 | 2/1994 | Saunders et al. ........................ 713/166 |
| 5,369,707 | 11/1994 | Follendore, III ........................... 380/25 |
| 5,528,579 | 6/1996 | Wadman et al. ........................... 370/15 |
| 5,577,209 | 11/1996 | Boyle et al. ............................... 380/23 |
| 5,590,202 | 12/1996 | Bestler et al. ............................. 380/49 |
| 5,629,981 | 5/1997 | Nerlikar ..................................... 380/25 |

FOREIGN PATENT DOCUMENTS

| | | | |
|---|---|---|---|
| WO 92/17960 | 8/1992 | European Pat. Off. | ........ H04L 12/22 |
| 41 25 830 | 1/1993 | Germany | .......................... H04L 9/32 |
| 2 256 564 | 12/1992 | United Kingdom | ............ G06F 12/14 |

*Primary Examiner*—Pinchus M. Laufer
*Attorney, Agent, or Firm*—Venable; Robert J. Frank; Allen Wood

[57] ABSTRACT

A communications system includes a plurality of interfaces (20) each of which can receive and/or transmit data to a common transmission network (21). Each interface (20) transmitting data to the network (21) attaches a classification code to the transmitted data, and each interface (20) receiving data from the network (21) retrieves the classification code and restricts access to the associated data in dependence upon that classification code. The invention alleviates the need to employ "secure" and "clear" communications networks in parallel, and is especially applicable to aircraft communications.

14 Claims, 3 Drawing Sheets

SECURE INTERNAL COMMUNICATION SYSTEM

BACKGROUND OF THE INVENTION

The present invention relates to a communications system for communicating data, which for example may be speech data, encrypted speech data, data from instruments or facsimiles, which data has a classification associated with it. In particular, but not exclusively, the invention relates to a communications system for use on board an aircraft, which communications system segregates clear and secure information.

"Secure internal communication system" is defined for the purposes of this specification as a communication system intended to carry at least some classified (secure) material, the system being internal in the sense that access to the system is restricted, as for example where the system is located on board a military aircraft.

On board some aircraft, especially military aircraft, it is necessary to be able to communicate both "secure" and "clear" data between two or more points on that aircraft. It is also necessary and important that communication can also be established quickly between one or more points on the aircraft and a point external to the aircraft, normally by means of radio apparatus. Satisfying both these requirements reliably results in a complex communications system in order to ensure that secure data cannot accidentally be transmitted externally, or to an unintentional recipient aboard the aircraft itself.

In certain military aircraft, for example advanced early warning aircraft (AWACS), there may be up to thirty or more interfaces between the communications system and equipment or crew members, which interfaces need to communicate both clear and secure information both within the aircraft and also to external sources via a radio link. FIG. 1 of the attached drawings schematically shows the arrangement adopted in such communications systems. This comprises a secure communication network 1 and clear communication network 2 to which a plurality of interfaces 5 to 7 are connected. Interfaces 3 to 4 may transmit speech data to or from a member of the air crew or provide information to or from instruments aboard the aircraft. Depending on the source of the information, this will either be routed via the secure network 1 or clear network 2. In this way, information on the secure network 1 is isolated from radio 7. Some crew members have the option of transmitting information either by secure network 1 or clear network 2, and this is typically achieved by means of a switch which indicates over which network the operator wishes to transmit. Secure information from any source which is to be transmitted externally via radio 7 is placed on the secure network 1 and addressed to an encryptor 6. The encryptor encrypts the data before transmitting it to the radio 7 by clear network 2. Similarly, any encrypted data received via the radio is decoded by encryptor 6, and the decoded data transmitted to its destination by secure network 1.

SUMMARY OF THE INVENTION

A drawback of the system illustrated in FIG. 1 is that it requires effectively two completely separate communications systems with two sets of wires, or other such links, running around the aircraft and two sets of circuitry at most connection points, one associated with the secure network and one with the clear network. It is the aim of the present invention to provide an improved communications system.

According to a first aspect of the present invention there is provided a communications system comprising means for attaching a code to data to be transmitted, which code indicates a classification associated with that data.

By employing the present invention, each piece of data to be transmitted can have a code, or tag, attached to it, this enabling, the classification of the data to be identified by means of the code as opposed to the communications network over which it is received, eliminating the need to have two separate networks.

Preferably the communications system comprises: a transmission medium; at least one interface through which data can be supplied to the transmission medium, the interface comprising an input for receiving the data, means for determining a classification associated with the data, means for attaching a classification code to the data dependent on the associated classification, and means for supplying the data and associated classification code to the transmission medium; and at least one interface through which the data can be extracted from the transmission medium, the interface comprising means for receiving the data and attached classification code, means for determining from the classification code the classification relating to the data, and means for controlling access to the data dependent on the classification.

The above arrangement enables a single transmission medium, which may be a transmission line network, typically an optical fibre network or a hard wired network, to convey both secure and clear information, eliminating the need for duplication, without compromising security. Only those interfaces authorised to receive a particular classification of data will permit that data to be disseminated. The system permits two or more classifications to be used.

Advantageously data can only be extracted from the transmission medium via the interfaces, thereby no other access can be gained to data on the system.

In certain applications it may be desirable that an interface permits data to be both supplied to and (extracted from the transmission medium, such an interface enabling, for example, a person to both transmit and receive speech data to and from the transmission medium.

Advantageously the system further comprises an encryptor connected to the transmission medium via at least one of the interfaces, the encryptor being arranged: to receive, from the transmission medium, data carrying a first classification code; to encrypt that data; and supply the encrypted data back to the transmission medium by an interface which attaches a different classification code. This enables data, for example speech data, having a secure classification code, or tag, associated with it to be encrypted and ereclassified such that the encrypted data can then be received by a device, for example a radio, which would not have had access to that data with its previous classification code.

Preferably the data transmitted by said transmission medium is in a digital format for this facilitates attachment of a classification code, or tag. It is particularly advantageous for the transmission medium to comprise a number of channels, each channel being associated with a data string received via one interface, the data string being transmitted via the transmission medium in a series of time sequential frames, each frame comprising one slot associated with a specific data string, each slot being defined by a number of bits with one bit, a classification code bit, being reserved for carrying a classification code. In this manner a classification code accompanies every slot in every frame.

Advantageously an interface supplying data to the transmission medium sets the status of the classification code bit such that the status of corresponding classification code bits of corresponding slots in sequential frames varies in a predetermined pattern indicative of an associated classification, the interface extracting information from the transmission medium comprising means for detecting said pattern. This enables only a single bit from each slot to establish a code. Furthermore the classification code can be selected such that any corruption of the code causes the system to assign a secure classification code to the associated data.

The present invention is particularly advantageous when employed in aircraft communications systems where security of information is primary importance and where it is desirable to minimise the amount of communications equipment carried.

According to a second aspect of the present invention there is provided a method of transmitting data comprising attaching a code to the data, which code indicates a classification associated with that data.

Preferably the method further comprises receiving data and an associated classification signal, attaching a classification code to the data in dependence on the classification signal received, transmitting the data and associated code via a transmission medium, receiving the data and associated code from the transmission medium, determining the classification from the classification code, and controlling access to the data dependent on the classification.

BRIEF DESCRIPTION OF THE DRAWINGS

One embodiment of the present invention will now be described, by way of example only, with reference to FIGS. 2 to 6 of the accompanying drawings, in which like reference numerals are used to indicate like. In the drawings.

DESCRIPTION OF THE PREFERRED EMBODIMENT

Figure 1:
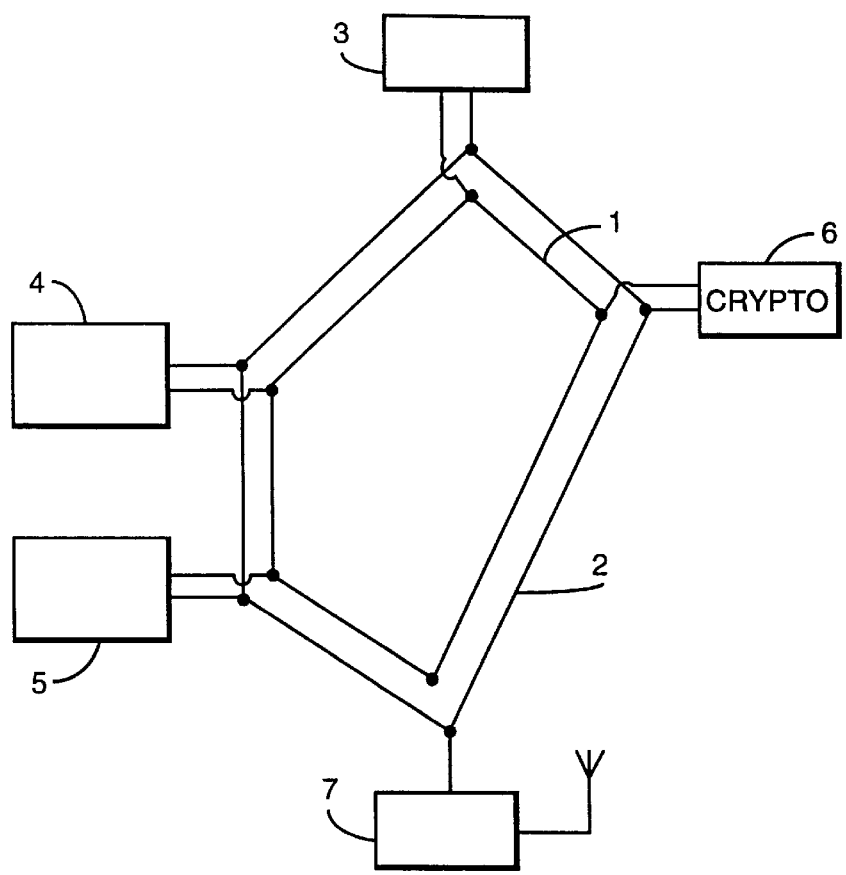
FIG. 1 schematically illustrates an arrangement adapted for use in a communication system for certain military aircraft.
Figure 2:
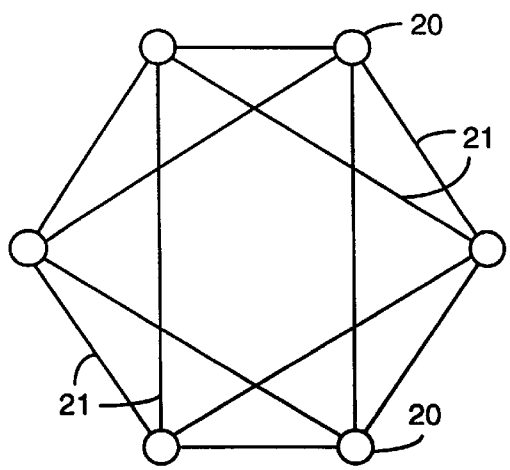
FIG. 2 schematically illustrates the interconnection between interfaces of a communications system in accordance with the present invention.

Referring to FIG. 2, there is illustrated a number of interfaces 20 each connected to four other interfaces via twisted pair wire links 21. The provision of four links to each interface is to provide redundancy in the event that any link or interface is damaged or malfunctions. The six interfaces could be linked in a simple linear arrangement, or alternatively in a closed loop arrangement which provides at least two routes between any two interfaces. Any number of interfaces 20 may be connected, but each of the interfaces 20 will have associated with it a particular piece of equipment, and on an aircraft at least one interface will be associated with a radio, at least one with a member of air crew permitting him to both receive and transmit speech data. In addition at least one interface will normally be associated with a resource of the aircraft such as instrumentation data or a radar, or means for generating an audible warning, for example in case of an engine failure.

Figure 3:
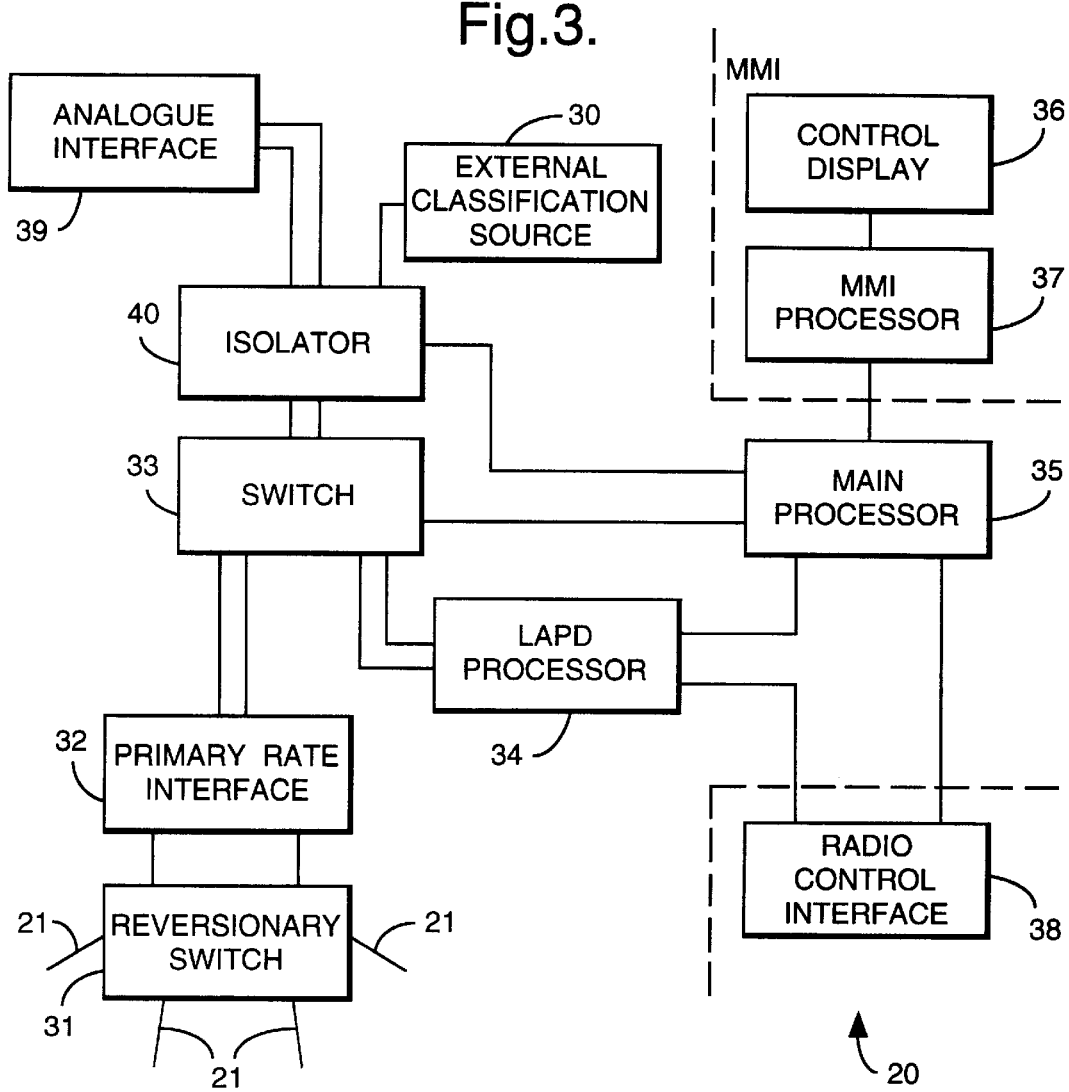
FIG. 3 schematically illustrates the various functions performed by each interface of FIG. 2.

Referring to FIG. 3, the functions performed by each of the interfaces 20 of FIG. 2 are illustrated. With the exception of the functions separated by broken lines, all other functions are common to all the interfaces regardless of the application to which the interface is put.

The interface 20 comprises a reversionary switch 31 connected to four twisted pair wire links 21 which are each in turn connected to a reversionary switch of one of the other interfaces 20 of FIG. 2. The reversionary switch has the function of maintaining appropriate connections between the twisted pairs 21 should the interface 20 be powered down or failed. This function is performed by a number of relays in the switch that cross-connect the external connections.

Data received on links 21 by the reversionary switch 31 is transmitted to the primary rate interface 32 which provides balanced termination of the communication links 21, extracts synchronisation information and provides plesiochronous buffering. The primary rate interface 32 is connected to switch 33 which routes both audio and control data as appropriate. The switch 33 can also connect any slot from any primary rate interface to any other primary rate interface, and it is by means of this switch 33 that the communications system, as illustrated in FIG. 2, is truly distributed.

Figure 4:
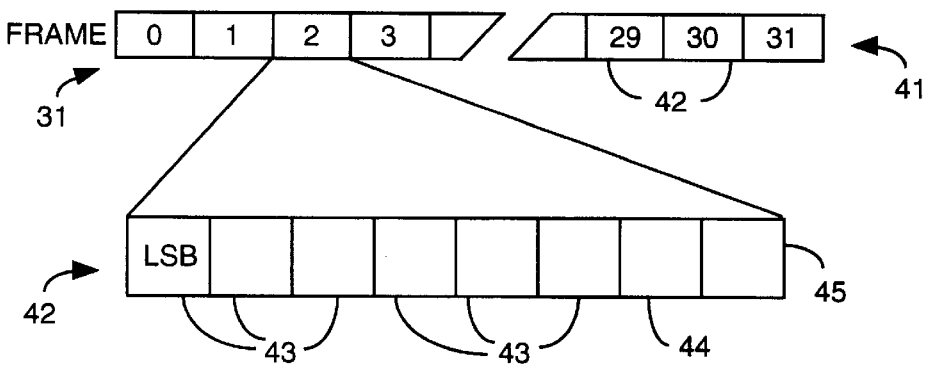
FIG. 4 shows the arrangement of a frame of data transmitted between the interfaces of FIGS. 2 and 3.

The communications system transmits data in a digital format that comprises a number of control slots as explained below with reference to FIG. 4. The switch 33 routes control slots to link access protocol on the D-channel (LAPD) processor 34 which formats both audio and control data into a suitable format. The LAPD processor 34 performs cyclic redundancy checking and associated management of frame acknowledgement, frame delimiting and bit stuffing.

The switch 33 and LAPD 34 are connected to a main processor 35 which is additionally connected to either a man/machine interface (MMI) consisting of a control display 36 and associated processor 37, if the particular interface 20 provides a terminal for a user, or alternatively if the particular interface is associated with an encryptor, there will be an input to the, main processor from the encryptor. If the interface 20 is associated with a radio, a radio control interface 38 is connected to both the main processor and the LAPD processor. These various inputs to the main processor 35 provide the processor with the address that data is being sent to, and the classification associated with that data. The main processor 35 also provides appropriate control data to the radio control interface, control display or encryptor.

All the data received and processed by the main processor 35 is control data, with all other data such as speech data being received or disseminated via analogue interface 39 and associated isolator. The analogue interface 39 depending on application may be connected via an A-to-D and/or D-to-A converter, to the microphone and headset of an operator, to the input/output of an encryptor, or to the input/output of a radio frequency transmitter/receiver. Data passing through the analogue interface 39 is the data that is to be, or has been transmitted via communications links 21. The analogue interface provides the input/output for all such data and can be selectively isolated from the rest of the communications system by isolator 40, controlled by the main processor 35, or external classification source 30.

The isolator 40 provides two functions. When data is received by the analogue interface 39 for transmission via links 21, a corresponding signal is received which indicates the classification of the information being received by the analogue interface 39. For example in the case of a man/ machine interface a classification signal is input by an operator via control display 36 and MMI processor 37. When the interface 20 is associated with a radio transmitter/receiver, the main processor 35 is pre-programmed to treat the information received as clear, similarly when the interface 20 is associated with an encryptor then encrypted data received from the encryptor via the analogue interface 39 will be classified as clear while data that has been deciphered is classified as secure. An appropriate control signal is applied to the isolator 40 which generates an appropriate classification code on the data transmitted. This code is described in more detail below with reference to FIGS. 4 and 5.

The isolator 43 in addition to coding data to be transmitted via the links 21 also isolates data received via the links 21 from the analogue interface 39 in dependence upon the classification code associated with the received data. Where the interface 20 is associated with a radio over which no secure data is permitted to be transmitted, any data received from the communications system having a code indicating that that data is secure is isolated by isolator 40 from the analogue interface. The mechanism by which the isolator decodes the classification signal is described below with reference to FIGS. 4, 5 and 6.

Where the interface 20 is associated with an encryptor, data is received from the links 21 of the communications system and the data encrypted or deciphered depending on the accompanying control information. Where data received from the encryptor is encrypted the isolator associates with that data a classification code indicating that that data is clear. This enables that data to be transmitted via an interface associated with a radio elsewhere on the communications system.

The data transmitted by the communications system is transmitted in a digital format as a number of sequential frames. Each frame 41 comprises thirty-two slots 42 as schematically illustrated in FIG. 4, each of which comprises eight bits 43, six bits carrying the data to be transmitted, with one bit, 44, reserved for control data and one bit, 45, reserved for a classification code. Corresponding slots in sequential frames define a channel, the system carrying up to thirty data channels simultaneously, with two channels being reserved for system control signals.

Figure 5A:
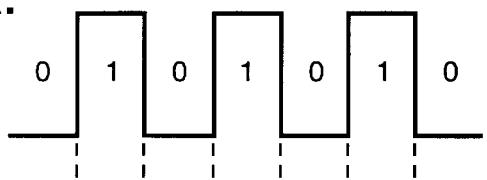
FIGS. 5a and 5b are an example of a classification code.
Figure 5B:
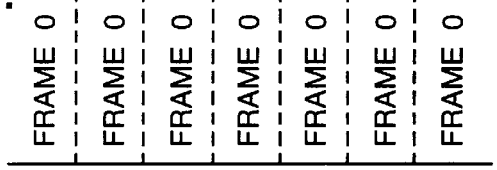

Data received by the interface 20 of FIG. 3 via the analogue interface 39 is encoded by the isolator 40 as either being clear or secure. When the isolator 40 receives a signal indicating the data received from the analogue interface 39 is clear, then the isolator alternatively sets classification bits 45 of sequential frames 41 high and low as illustrated in FIG. 5A. If the isolator receives a signal indicating that the information received from the analogue interface 39 is secure then it sets each corresponding classification bit 45 of each sequential frame low, as illustrated in FIG. 5B. The data is then transmitted by the interface 20 onto lines 21 with the data being transmitted on a particular channel which channel comprises one set of consecutive slots 42 of sequential frames 41.

Figure 6:
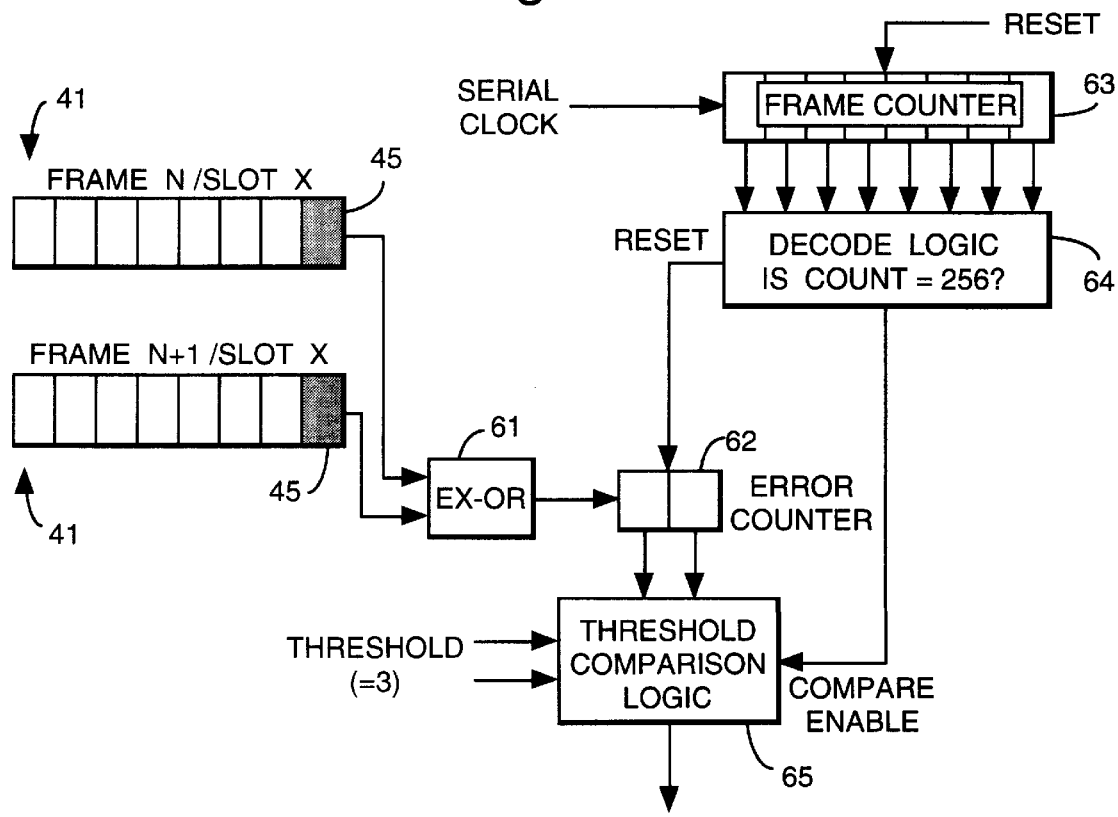
FIG. 6 illustrates apparatus for decoding the classification code of FIG. 5.

Referring to FIG. 6, the isolator 40 extracts the classification bit 45 from data received via links 21 and compares the logic of corresponding classification bits 45 of consecutive frames 41 by exclusive OR-ing the status of the present bit with that of the previous bit. If the data received is clear, the status of these bits will alternate between high and low and the exclusive OR gate 61 will not detect any errors. If the security bits of corresponding slots in consecutive frames do not alternate between high and low then the exclusive OR gate will detect an error which will be recorded in error counter 62. After 256 frames have been recorded in the frame counter 63 the error counter is reset by decode logic 64. A threshold comparator 65 compares the output of the error counter 62 with a predetermined threshold value, normally three, such that if the error count reaches this threshold then the data being received is classified as secure and the isolator 30 sends a signal to the main processor 25 which determines whether data with that classification code can be permitted to pass to the analogue interface. Any corruption of the classification code conveyed by sequential classification bits will cause a large number of errors to be detected by the error counter which will in turn cause the associated data to be treated as secure. It will be noted that a single bit in error will result in apparently two errors on the counter.

Many variations of the embodiment described above, with reference to the figures, will be apparent to a person skilled in the art, which variations will be within the scope of the appended claims. In particular it will be appreciated that, depending on the amount of data to be transmitted and the capacity of the system used, it may be desirable to transmit the classification code as a single bit in a time multiplexed frame sequence, where a classification code bit is placed in selected frames only.

What is claimed:

1. A secure internal communication system comprising:

a) a transmission network;

b) at least one interface through which data can be supplied to the transmission network, the interface comprising one or more inputs for receiving: the data; an address for identifying one or more recipients for the data; and a classification associated with the data, the interface being arranged to insert intrinsically in the data a classification code dependent on the associated received classification and transmit to the intended one or more recipients of the data, via the transmission network, said data with the inserted classification code; and c) a plurality of interfaces each arranged to identify and receive from the transmission network data and the associated classification code addressed to it, each interface comprising means for receiving the data and attached classification code, means for determining from the classification code the classification relating to the data, and means for controlling access to the data dependent on the classification, wherein data can be both supplied to and extracted from the transmission network via one of the interfaces.

2. A system as claimed in claim 1, wherein data is transmitted by said transmission network in a digital format.

3. A secure internal communication system comprising:

a) a transmission network;

b) at least one interface through which data can be supplied to the transmission network, the interface comprising one or more inputs for receiving: the data; an address for identifying one or more recipients for the data; and a classification associated with the data, the interface being arranged to insert intrinsically in the data a classification code dependent on the associated received classification and transmit to the intended one or more recipients of the data, via the transmission network, said data with the inserted classification code; and c) a plurality of interfaces each arranged to identify and receive from the transmission network data and the associated classification code addressed to it, each interface comprising means for receiving the, data and attached classification code, means for determining from the classification code the classification relating to the data, and means for controlling access to the data dependent on the classification, wherein the transmission network is common to at least three interfaces.

4. A secure internal communication system comprising:
a) a transmission network;
b) at least one interface through which data can be supplied to the transmission network, the interface comprising one or more inputs for receiving: the data; an address for identifying one or more recipients for the data; and a classification associated with the data, the interface being arranged to insert intrinsically in the data a classification code dependent on the associated received classification and transmit to the intended one or more recipients of the data, via the transmission network, said data with the inserted classification code; and
c) a plurality of interfaces each arranged to identify and receive from the transmission network data and the associated classification code addressed to it, each interface comprising means for receiving the data and attached classification code, means for determining from the classification code the classification relating to the data, and means for controlling access to the data dependent on the classification; and
d) a transmitter for receiving data from the transmission network via an associated interface and transmitting that data via an unrestricted network, the system comprising means for preventing transmission of the data via said transmitter in dependence on the associated classification code.

5. A secure internal communication system comprising:
a) a transmission network;
b) at least one interface through which data can be supplied to the transmission network, the interface comprising one or more inputs for receiving: the data; an address for identifying one or more recipients for the data, and a classification associated with the data, the interface being arranged to insert in the data a classification code dependent on the associated received classification and transmit to the intended one or more recipients of the data, via the transmission network, said data with the inserted in classification code;
c) a plurality of interfaces each arranged to identify and receive from the transmission network data and the associated classification code addressed to it, each interface comprising means for receiving the data and attached classification code, means for determining from the classification code the classification relating to the data, and means for controlling access to the data dependent on the classification; and
d) an encryptor that is connected to the transmission network via at least one of said interfaces, the encryptor being arranged to receive from the transmission network data carrying a first classification code, to encrypt that data and supply the encrypted data back to the transmission network by an interface which attaches a different classification code.

6. A secure internal communication system comprising:
a) a transmission network;
b) at least one interface through which data can be supplied to the transmission network, the interface comprising one or more inputs for receiving: the data; an address for identifying one or more recipients for the data; and a classification associated with the data, the interface being arranged to insert in the data a classification code dependent on the associated received classification and transmit to the intended one or more recipients of the data, via the transmission network, said data with the inserted in classification code; and
c) a plurality of interfaces each arranged to identify and receive from the transmission network data and the associated classification code addressed to it, each interface comprising means for receiving the data and attached classification code, means for determining from the classification code the classification relating to the data, and means for controlling access to the data dependent on the classification, wherein data is transmitted by the transmission network in a digital format, and wherein the transmission network comprises a number of channels, each channel being associated with a data string received via one interface, the data string being transmitted via the transmission network in a series of time sequential frames, each frame comprising one slot associated with a specific data string, each slot being defined by a number of bits with one bit, a classification code bit, being reserved for carrying a classification code.

7. A system as claimed in claim 6, wherein the system is part of a larger communication system and wherein data can only be transmitted to the larger system via one or more of said interfaces.

8. A system as claimed in claim 6, wherein the transmission network is a transmission line network.

9. A system as claimed in claim 6 wherein the classification code bit is inserted only in selected frames.

10. A system as claimed in claim 6 wherein an interface supplying data to the transmission network sets the status of the classification code bit such that the status of corresponding classification code bits of corresponding slots in sequential frames varies in a predetermined pattern indicative of an associated classification, and in which an interface extrating information from the transmission network comprises means for detecting said pattern.

11. A system as claimed in claim 10 wherein in the absence of the correct pattern being detected the receiving interface allocates a secure classification to that data.

12. A system as claimed in claim 10 wherein the classification code bit is inserted only in selected frames and wherein in the absence of the correct pattern being detected the receiving interface allocates a secure classification to that data.

13. A method of transmitting data in a secure internal communication system, the method comprising receiving data, an associated classification signal, and an address identifying one or more recipients for the data, inserting in the data a classification code in dependence on the classification signal received, transmitting the data in a digital formal and associated code to the intended one or more recipients of the data via a transmission network, identifying at an address location on the network data addressed to that location, receiving data and the associated code from the transmission network, determining the classification from the classification code, and controlling access to the data dependent on the classification, wherein a data string is transmitted on one of a number of channels, the channel comprising one slot in a series of sequential frames, each slot comprising a number of bits, the method further comprising setting the status of one bit, a classification code bit, of corresponding slots in sequential frames in dependence on the classification signal received such that the status of sequential classification code bits varies in a predetermined pattern indicative of an associated classification, and detecting the pattern on receiving the data and associated code.

14. A vehicle comprising:

an aircraft; and a secure internal communication system in the aircraft, said secure internal communication system comprising:

a) a transmission network;

b) at least one interface through which data can be supplied to the transmission network, the interface comprising one or more inputs for receiving: the data; an address for identifying one or more recipients for the data; and a classification associated with the data, the interface being arranged to insert intrinsically in the data a classification code dependent on the associated received classification and transmit to the intended one or more recipients of the data, via the transmission network, said data with the inserted classification code; and c) a plurality of interfaces each arranged to identify and receive from the transmission network data and the associated classification code addressed to it, each interface comprising means for receiving the data and attached classification code, means for determining from the classification code the classification relating to the data, and means for controlling access to the data dependent on the classification.

* * * * *